US012402222B2

(12) United States Patent
Yan

(10) Patent No.: US 12,402,222 B2
(45) Date of Patent: Aug. 26, 2025

(54) LIGHT EMITTING CONTROL CIRCUIT AND LIGHTING DEVICE USING THE SAME

(71) Applicant: Foshan Vane Technology Co., Ltd, Foshan (CN)

(72) Inventor: Jiasen Yan, Foshan (CN)

(73) Assignee: Foshan Vane Technology Co., Ltd, Foshan (CN)

( * ) Notice: Subject to any disclaimer, the term of this patent is extended or adjusted under 35 U.S.C. 154(b) by 67 days.

(21) Appl. No.: 18/621,414

(22) Filed: Mar. 29, 2024

(65) Prior Publication Data

US 2024/0244725 A1 Jul. 18, 2024

(30) Foreign Application Priority Data

Feb. 5, 2024 (CN) ......................... 202420282906.6

(51) Int. Cl.
*H05B 45/20* (2020.01)

(52) U.S. Cl.
CPC .................................... *H05B 45/20* (2020.01)

(58) Field of Classification Search
CPC ....... H05B 45/20; H05B 45/50; H05B 47/185
See application file for complete search history.

(56) References Cited

U.S. PATENT DOCUMENTS 9,030,122 B2 * 5/2015 Yan ........................ H05B 45/14 315/307
10,660,168 B2 * 5/2020 Takizawa ............... H05B 45/10
2011/0068700 A1 * 3/2011 Fan .................... H05B 45/3725 315/185 R

* cited by examiner

*Primary Examiner* — Minh Tran
*Assistant Examiner* — Minh D A
(74) *Attorney, Agent, or Firm* — ScienBiziP, P.C.

(57) ABSTRACT

Disclosed in the present application are a light emitting control circuit and a lighting device. The light-emitting control circuit is connected to the power supply and controls a light emitting module to emit light, and the light emitting control circuit includes a first control circuit and a second control circuit. The first control circuit is connected to the light emitting module, the first control circuit control the color temperature of the light emitting module, and the second control circuit is connected to the light emitting module, and the second control circuit is used to control brightness of the light emitting module. The light emitting control circuit and the lighting device of the present application can solve the problem of limited number of color temperature variations of the lighting device in the prior art and enhance the user's experience.

20 Claims, 5 Drawing Sheets

LIGHT EMITTING CONTROL CIRCUIT AND LIGHTING DEVICE USING THE SAME

FIELD

The present application relates to the field of lightings, and specifically to a light emitting control circuit and a lighting device using the same.

BACKGROUND

Lighting device with energy-saving, environmental protection and other advantages and widely occupy the main position of the lamps and lanterns market, is one of the necessities of modern life. Traditional lighting device can only control light-emitting diode (LED) lamps to present a color temperature or two color temperatures, and the number of color temperature changes is limited, it is difficult to meet the needs of users.

Therefore, improvement is desired.

DETAILED DESCRIPTION

The technical solutions in the embodiments of the present application will be described below in conjunction with the accompanying drawings in the embodiments of the present application, and it is clear that the embodiments described are only a portion of the embodiments of the present application and not all of them.

In the description of the embodiments of the present application, the technical terms "first," "second," and the like are only used to distinguish different objects, and are not to be construed as indicating or implying relative importance, or implicitly specifying the number, specific order, or primary-secondary relationship of the indicated technical features. In the description of the embodiments of the present application, "more than one" means more than two, unless otherwise expressly and specifically limited.

Figure 1:
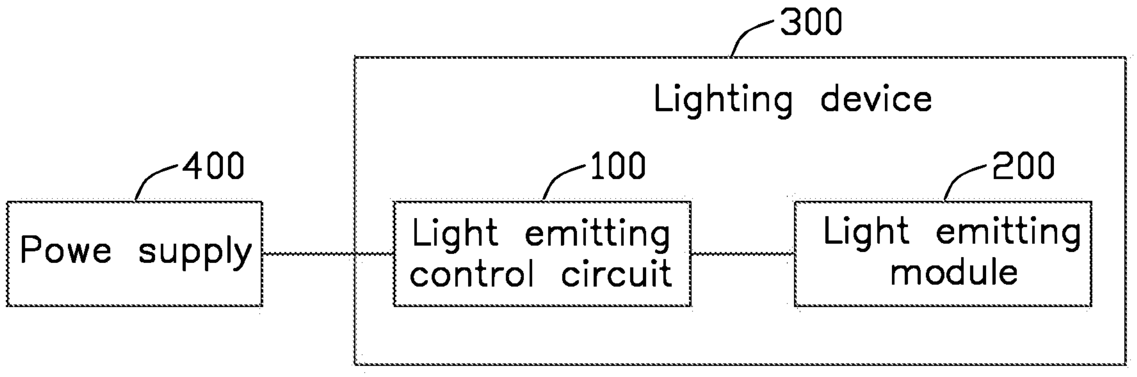
FIG. 1 is a block diagram of a lighting device according to an embodiment of the present application.

FIG. 1 illustrates a lighting device 300 in accordance with an embodiment of the present application.

The lighting device is electrically connected to a power supply 400, and the power supply power supply 400 is used to provide necessary supply voltage for the normal operation of the lighting device 300. Optionally, the power supply 400 can be a utility power, and the supply voltage may be a grid voltage output by the utility power. The power supply 400 can output an alternating current (AC) voltage to the lighting device 300.

The lighting device 300 includes a light emitting control circuit 100 and a light emitting module 200. The light emitting control circuit 100 is electrically connected to the light emitting module 200.

The light emitting control circuit 100 is electrically connected between the power supply 400 and the light emitting module 200. The light emitting control circuit 100 can receive the AC voltage output from the power supply 400 and control the light emitting module 200 to emit light. In the embodiment, the light emitting control circuit 100 can control the brightness of the light emitting module 200 and the color temperature of the light emitting module 200.

Figure 2:
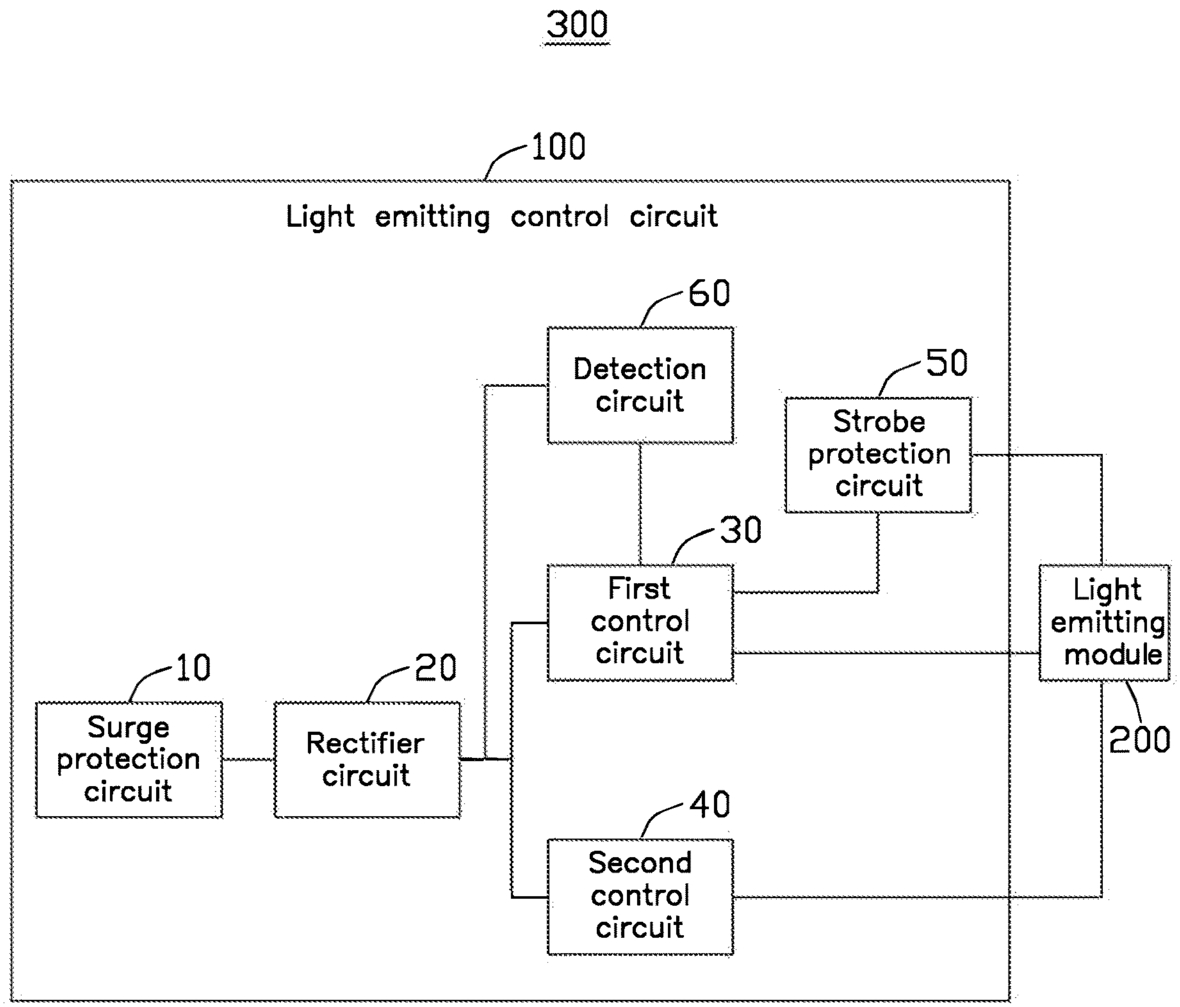
FIG. 2 is a block diagram of a lighting device according to another embodiment of the present application.

Referring to FIG. 2, in one embodiment, the light emitting control circuit 100 includes a surge protection circuit 10, a rectifier circuit 20, a first control circuit 30, a strobe protection circuit 50, and a detection circuit 60.

The surge protection circuit 10 is electrically connected between an output terminal of the power supply 400 and an input terminal of the rectifier circuit 20, and the AC voltage of the power supply 400 is output to the input terminal of the rectifier circuit 20 after passing through the surge protection circuit 10, to prevent the light emitting control circuit 100 from being subjected to electromagnetic interference.

An output terminal of the rectifier circuit 20 is electrically connected to the first control circuit 30 and the second control circuit 40. The rectifier circuit 20 is used to rectify and filter the AC voltage to output a direct current (DC) voltage to the first control circuit 30, the second control circuit 40 and the light emitting module 200.

The first control circuit 30 is used to control the color temperature of the light emitting module 200. The second control circuit second control circuit 40 is used to control the brightness of the light emitting module 200.

The strobe protection circuit 50 is electrically connected between the light emitting module 200 and an output terminal of the rectifier circuit 20. The strobe protection circuit 50 is used to prevent the light emitting module 200 from generating strobes.

The detection circuit 60 is electrically connected between the first control circuit 30 and the output terminal of the rectifier circuit 20, and the detection circuit 60 is used to detect the turning on and turning off of the power supply 400, and to feedback the detection result to the first control circuit 30. The first control circuit first control circuit 30 can adjust the color temperature of the light emitting module 200 or the brightness of the light emitting module 200 according to the detection result.

Figure 3:
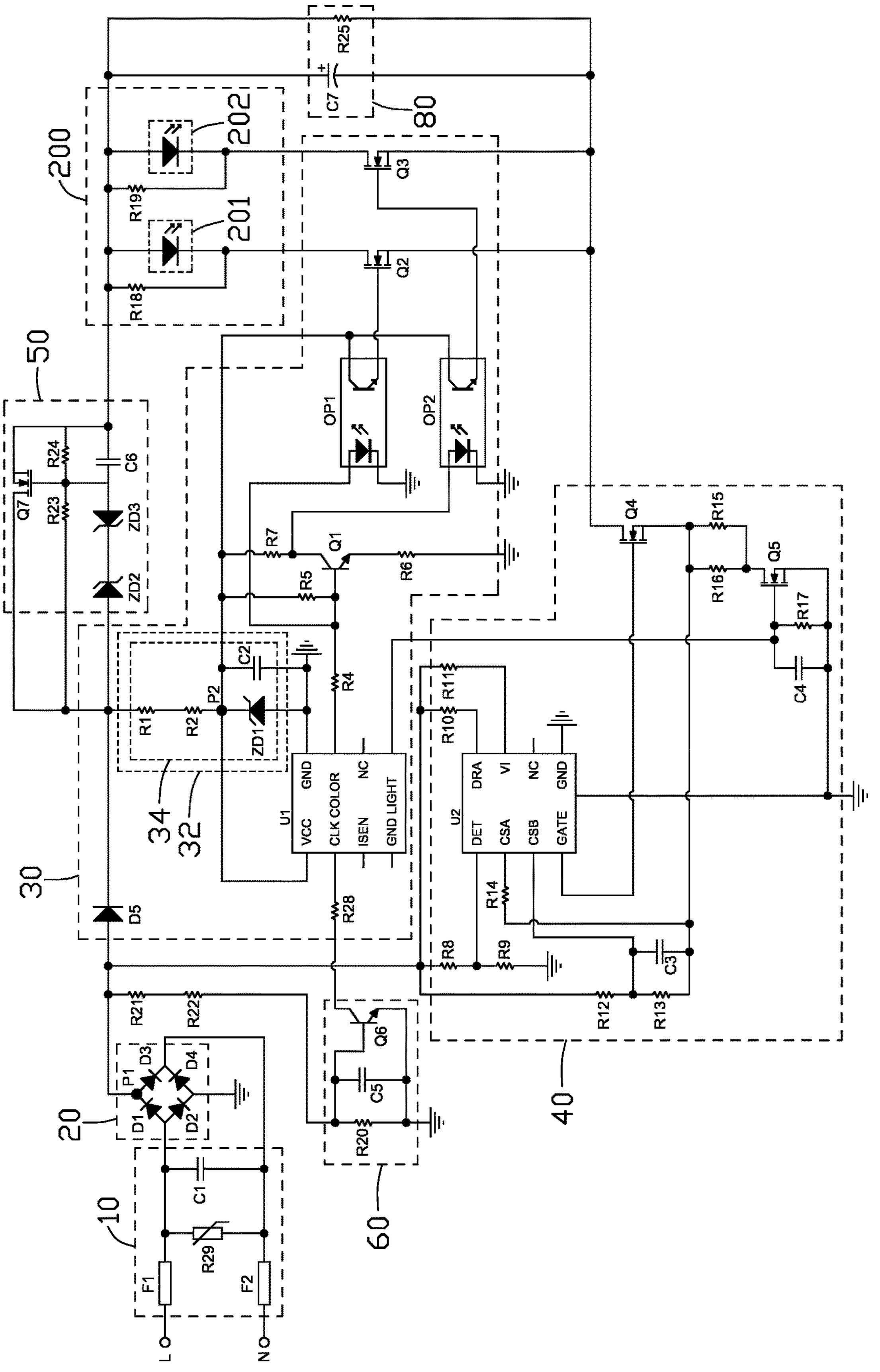
FIG. 3 is a circuit diagram of a lighting device according to an embodiment of the present application.

FIG. 3 is a circuit diagram of the lighting device 300 according to an embodiment of the present application.

The light emitting module 200 includes a light emitting element 201 and a light emitting element 202. Optionally, both the light emitting element 201 and the light emitting element 202 are LED beads.

The surge protection circuit 10 includes a fuse F1, a fuse F2, a resistor R29, and a capacitor C1. A first terminal of the fuse F1 is connected to a first output terminal L of the power supply 400, and a second terminal of the fuse F1 is connected to the rectifier circuit 20. A first terminal of the fuse F2 is connected to a second output terminal N of the power supply 400, and a second terminal of the fuse F2 is connected to the rectifier circuit 20. A first terminal of the resistor R29 is connected to a second terminal of the fuse F1, and a second terminal of the resistor R29 is connected to a second terminal of the fuse F2. The first terminal of the capacitor C1 is connected to the second terminal of the fuse F1, and the second terminal of the capacitor C1 is connected to the second terminal of the fuse F2. The resistor R29 is a varistor, and the resistor R29 can provide lightning protection and overvoltage protection for the circuit. The capacitor C1 is a safety capacitor, and the capacitor C1 can suppress common mode interference and differential mode interference.

The rectifier circuit 20 includes a diode D1, a diode D2, a diode D3, and a diode D4.

An anode of the diode D1 is connected to an anode of the diode D2 and the second terminal of the fuse F1, a cathode of the diode D1 is connected to an anode of the diode D3, a cathode of the diode D3 is connected to a cathode of the diode D4 and the second terminal of the fuse F2, an anode of the diode D4 is grounded and a cathode of the diode D2 is grounded. In the embodiment, the rectifier circuit 20 can convert the AC voltage into a stable DC voltage.

The first control circuit 30 includes a voltage conversion circuit 32, a first chip U1, a switch transistor Q1, a photoelectric coupler OP1, a photoelectric coupler OP2, a switch transistor Q2, and a switch transistor Q3. The first chip U1 may be a microcontroller.

The photoelectric coupler OP1 includes a first light emitting unit and a first switch. The first switch includes an emitter electrode and a collector electrode. The photoelectric coupler OP2 includes a second light emitting unit and a second switch. The second switch includes an emitter electrode and a collector electrode. Optionally, the first light emitting unit can be a first light emitting diode, and the second light emitting unit can be a second light emitting diode.

In one embodiment, the voltage conversion circuit 32 can include a first voltage conversion unit 34, and the first voltage conversion unit 34 includes a resistor R1, a resistor R2, a voltage stabilizing diode ZD1 and a capacitor C2. The first terminal of the resistor R1 is connected to a cathode of the diode D5, a anode of the diode D5 is connected to a node P1 between the cathode of the diode D1 and the anode of the diode D3, a cathode of the voltage stabilizing diode ZD1 is connected to the second terminal of the resistor R1 through the resistor R2, a anode of the voltage stabilizing diode ZD1 is connected to the ground pin GND of the first chip U1, and the anode of the voltage stabilizing diode ZD1 is grounded, and the first terminal of the capacitor C2 is connected to a node P2 between the cathode of the voltage stabilizing diode ZD1 and the resistor R2, and the second terminal of the capacitor C2 is connected to the anode of the voltage stabilizing diode ZD1. The node P2 between the cathode of the voltage stabilizing diode ZD1 and the resistor R2 is also connected to the power supply pin VCC of the first chip U1. The supply voltage rectified by the rectifier circuit 20 is reduced by the resistor R1 and the resistor R2, and then stable voltage is output through the voltage stabilizing diode ZD1 and the capacitor C2, thus providing stable DC voltage for other circuits. For example, the rectifier circuit 20 can rectify an AC voltage output from the power supply 400 to a DC voltage, and the voltage conversion circuit 32 can reduce the DC voltage output by the rectifier circuit 20 to a 5V DC voltage, thereby outputting a 5V DC voltage to power the first control circuit 30. The 5V voltage output from the node P2 can supply power to the first chip U1. In other words, the voltage conversion circuit 32 can be a buck voltage stabilizing circuit.

A first terminal of the switch transistor Q1 is connected to a color temperature control pin COLOR of the first chip U1 through the resistor R4, the first terminal of the switch transistor Q1 is also connected to the node P2 through the resistor R5, a second terminal of the switch transistor Q1 is grounded through the resistor R6, and a third terminal of the switch transistor Q1 is connected to the node P2 through the resistor R7.

The first terminal of the switch transistor Q1 is also connected to the anode of the first light emitting unit of the photoelectric coupler OP1, the cathode of the first light emitting unit of the photoelectric coupler OP1 is grounded, the collector electrode of the first switch is connected to the node P2, and the emitter electrode of the first switch is connected to the first terminal of the switch transistor Q2. The third terminal of the switch transistor Q1 is connected to the anode of the second light emitting unit of the photoelectric coupler OP2, the cathode of the second light emitting unit of the photoelectric coupler OP2 is grounded, the collector of the second switch is connected to the node P2, and the emitter electrode of the second switch is connected to the first terminal of the switch transistor Q3.

The second terminal of the switch transistor Q2 is connected to the second control circuit 40, the third terminal of the switch transistor Q2 is connected to the first terminal of the light emitting element 201, the second terminal of the light emitting element 201 is connected to the strobe protection circuit 50, and the first terminal of the light emitting element 201 is also connected to the second terminal of the light emitting element 201 through the resistor R18. The second terminal of the switch transistor Q3 is connected to the second control circuit 40, the third terminal of the switch transistor Q3 is connected to the first terminal of the light emitting element 202, the first terminal of the light emitting element 202 is also connected to the second terminal of the light emitting element 202 through the resistor R19, and the second terminal of the light emitting element 202 is connected to the strobe protection circuit 50. The resistor R18 and the resistor R19 may remove problems such as afterglow for the light emitting element 201 and light emitting element 202, respectively.

In this embodiment, the switch transistor Q1 is an NPN-type triode. In other embodiments, the switch transistor Q1 may also be a Metal-Oxide-Semiconductor Field-Effect Transistor (MOSFET).

In this embodiment, the switch transistor Q2 and the switch transistor Q3 are MOS transistors.

The second control circuit 40 includes a second chip U2, a switch transistor Q4, a switch transistor Q5, capacitors C3-C4, and resistors R8-R17.

The ground pin GND of the second chip U2 is grounded, the compensation setting pin DET of the second chip U2 is connected to the node P1 through the resistor R8, and the compensation setting pin DET of the second chip U2 is also grounded through the resistor R9. The signal pin DRA of the second chip U2 is connected to the node P1 through the resistor R10, and the power supply pin VI of the second chip U2 is connected to the node P1 through the resistor R11. The output current setting pin CSB of the second chip U2 is connected to the node P1 through the resistor R12, the output current setting pin CSB of the second chip U2 is also connected to the second terminal of the switch transistor Q4 through the resistor R13, the output current setting pin CSB of the second chip U2 is also connected to the second terminal of the switch transistor Q4 through the capacitor C3, the current setting pin CSA of the second chip U2 is connected to the second terminal of the switch transistor Q4 through the resistor R14. The drive pin GATE of the second chip U2 is connected to the first terminal of the switch transistor Q4, and the third terminal of the switch transistor Q4 is connected to the second terminal of the switch transistor Q2 and the second terminal of the switch transistor Q3. The second terminal of the switch transistor Q4 is also connected to the third terminal of the switch transistor Q5 through the resistor R15, the second terminal of the switch transistor Q4 is also connected to the third terminal of the switch transistor Q5 through the resistor R16, the first terminal of the switch transistor Q5 is connected to the brightness control pin LIGHT of the first chip U1, the first terminal of the switch transistor Q5 is also grounded through the capacitor C4, and the first terminal of the switch transistor Q5 is also grounded through the resistor R17. In this embodiment, the switch transistor Q4 and the switch transistor Q5 are MOS transistors.

The second control circuit 40 mayserve as the brightness control circuit of the present application and may realize the brightness adjustment of the light emitting module 200.

As an example, the AC voltage output from the power supply 400 is rectified by the rectifier circuit 20 to output a power supply voltage, which supplies power to the second chip U2 through the resistor R11. In the normal operating state of the second control circuit 40, the second chip U2 controls the switch transistor Q4 to be on all the time through the drive pin GATE. The first chip U1 controls the brightness of the light emitting module 200 by adjusting the duty cycle of the pulse modulation signal output from the brightness control pin LIGHT. In addition, the supply voltage output from the rectifier circuit 20 will also form a voltage overvoltage protection through the resistor R8 and the resistor R9. When the detection voltage of the compensation setting pin DET of the second chip U2 is greater than a set value (e.g., 1.6 V), the second chip U2 will determine that the voltage of the power supply 400 is too high, and the drive pin GATE of the second chip U2 will not output a signal, thereby turning off the switch transistor Q4 to protect the circuit. The present application can adjust the current flowing through the light emitting element 201 and the light emitting element 202 by adjusting the resistance values of the resistor R12 and the resistor R13. In the embodiment, the resistor R15 and the resistor R16 are current sampling resistors, in other words, the current setting pin CSA of the second chip U2 samples the current magnitude of the light emitting element 201 and the light emitting element 202 through the resistor R15 and the resistor R16 and can be converted into a corresponding sampling voltage by the resistor R14. When the sampling voltage exceeds a reference voltage (e.g., strobe protection circuit 500 mV) set by the second chip U2, the drive pin GATE of the second chip U2 will not output a signal, thereby turning off the switch transistor Q4 to protect the circuit.

The brightness control pin LIGHT of the first chip U1 outputs a pulse modulation signal to control the state of the switch transistor Q5, which in turn adjusts the current flowing through the light emitting module 200, thereby adjusting the brightness of the light emitting module 200.

The color temperature control pin COLOR of the first chip U1 can output a control signal having a set duty cycle to control the color temperature of the light emitting module 200.

As an example, during a first time period t1, the color temperature control pin COLOR of the first chip U1 outputs a control signal to the first light emitting unit of the photoelectric coupler OP1 to control the first light emitting unit to emit light so as to turn on the first switch, and the voltage signal output from the node P2 is transmitted to the switch transistor Q2 through the first switch to turn on the switch transistor Q2, thereby controlling the light emitting element 201 to emit light (At this time, both the switch transistor Q4 and the switch transistor Q5 are turned on). In addition, the control signal will also turn on the switch transistor Q1 to cause the anode of the second light emitting unit of the photoelectric coupler OP2 to be grounded through the resistor R6, and the second light emitting unit not to emit light, so that the second switch of the photoelectric coupler OP2 are turned off, to control the switch transistor Q3 to be turned off, and thereby control the light emitting element 202 not to emit light. That is, during the first time period t1, the light emitting element 201 emits light and the light emitting element 202 does not emit light.

During a second time period t2, the color temperature control pin COLOR of the first chip U1 does not output a control signal. In other words, the first light emitting unit of the photoelectric coupler OP1 does not emit light to turn off the switch transistor Q2, thereby controlling the light emitting element 201 not to emit light. In addition, the switch transistor Q1 is in the off state, the anode of the second light emitting unit of the photoelectric coupler OP2 receives a voltage signal from the node P2 through the resistor R7, and the second light emitting unit emits light to turn on the second switch, in which case the voltage signal output from the node P2 will turn on the switch transistor Q3, and thereby control the light emitting element 202 to emit light (at this time, the switch transistor Q4 and the switch transistor Q5 are both turned on). That is, during the second time period t2, the light emitting element 201 does not emit light and the light emitting element 202 emits light.

The first time period t1 and the second time period t2 are one time period.

Therefore, the lighting device 300 of the present application can realize the control of multiple color temperature variations of the light emitting module 200 by outputting control signals with different duty cycles from the first chip U1.

The detection circuit 60 includes a switch transistor Q6, a capacitor C5, and a resistor R20. A first terminal of the switch transistor Q6 is connected to the node P1 through a resistor R22 and a resistor R21, and the first terminal of the switch transistor Q6 is also grounded through the resistor R20. A second terminal of the switch transistor Q6 is grounded, the second terminal of the switch transistor Q6 is also connected to the first terminal of the switch transistor Q6 through the capacitor C5, and the third terminal of the switch transistor Q6 is also connected to the detection pin CLK of the first chip U1 through the resistor R28. In the present embodiment, the switch transistor Q6 can be an NPN-type triode.

In one embodiment, the first chip U1 can detect the switch switching state of the lighting device 300 through the detection circuit 60 and correspondingly control the color temperature of the light emitting module 200. In other embodiments, the first chip U1 can also detect the switch switching state of the lighting device 300 through the detection circuit 60, and correspondingly control the color temperature of the light emitting module 200 and the brightness of the light emitting module 200.

When the user needs to use the lighting device 300 for illumination, the user turns on the switch of the lighting device 300, the power supply 400 is electrically connected to the lighting device 300 (i.e. opens the lighting device 300), and outputs the AC voltage to the lighting device 300, the node P1 will output the power supply voltage, and the first chip U1 will control the light emitting module 200 to work at the color temperature before the last shutdown of the lighting device 300.

In one scenario where the user adjusts the color temperature of the lighting device 300, when the user needs to adjust the color temperature of the lighting device 300 to a first color temperature, the user turns off the switch of the lighting device 300 at a first moment T1, and the power supply 400 is disconnected from the lighting device 300 (i.e., the lighting device lighting device 300 is turned off), the node P1 does not output the power supply voltage, the switch transistor Q6 is in the off state, and the detection pin CLK of the first chip U1 is in a high-level state. Then, at a second moment T2, the user turns on the switch of the lighting device 300, the power supply 400 is electrically connected to the lighting device 300 (i.e. opens the lighting device 300 again), and the switch transistor Q6 is turned on, the detection pin CLK of the first chip U1 is grounded through the resistor R28, and the detection pin CLK of the first chip U1 detects a detection signal at a low-level state. At this time, the color temperature control pin COLOR of the first chip U1 outputs a control signal having a first duty cycle, thereby controlling the light emitting module 200 to operate at the first color temperature. The second moment T2 is after the first moment T1, and the time between the first moment T1 and the second moment T2 is within a preset time of the first chip U1. If outside the preset time, the first chip U1 will memorize the current first color temperature so that the current first color temperature can be used the next time the user uses the lighting device for lighting.

A judgment time from the start of timing each time the user turns off the switch of the lighting device 300 to the next time the user turns on the switch of the lighting device 300 is a time for determining whether the lighting device 300 needs to switch the color temperature.

For example, if the judgment time is less than the preset time, the first chip U1 determines that the lighting device 300 needs to switch the color temperature. If the judgment time is greater than or equal to the preset time, the first chip U1 determines that the lighting device 300 does not need to switch the color temperature.

In another scenario where the user adjusts the color temperature of the lighting device 300, when the user needs to adjust the color temperature of the lighting device 300 to a second color temperature, the user turns off the switch of the lighting device 300 at a first moment T1, and the detection pin CLK of the first chip U1 is in a high-level state. Then, the user turns on the switch of the lighting device 300 at a second moment T2, the detection pin CLK of the first chip U1 detects a detection signal at a low-level state. The user turns off the switch of the lighting device 300 again at a third moment T3, and the detection pin CLK of the first chip U1 is in a high-level state, and then the user turns on the switch of the lighting device 300 again at a fourth moment T4, and the detection pin CLK of the first chip U1 detects the detection signal at a low-level state. At this time, the color temperature control pin COLOR of the first chip U1 outputs a control signal having a second duty cycle, thereby controlling the light emitting module 200 to operate at the second color temperature. The second moment T2 is after the first moment T1, the third moment T3 is after the second moment T2, and the fourth moment T4 is after the third moment T3. The time between the first moment T1 and the second moment T2 is within the preset time of the first chip U1, and the time between the third moment T3 and the fourth moment T4 is within the preset time of the first chip U1. If outside the preset time, the first chip U1 will memorize the current second color temperature so that the current second color temperature can be used the next time the user uses the lighting device for lighting.

The first chip U1 can determine the switch switching state of the lighting device 300 based on the number of times the detection signal is received within a preset time. Therefore, the first chip U1 can adjust the duty cycle of the color temperature control pin COLOR according to the switch switching of the lighting device 300 by the user, thereby realizing the adjustment of the color temperature of the light emitting module 200.

The strobe protection circuit 50 includes a switch transistor Q7, a voltage stabilizing diode ZD2, a voltage stabilizing diode ZD3, a capacitor C6, a resistor R23 and a resistor R24.

An anode of the voltage stabilizing diode ZD2 is connected to a cathode of the diode D5, a second terminal of the switch transistor Q7, and the first terminal of the resistor R23, a cathode of the voltage stabilizing diode ZD2 is connected to a cathode of the voltage stabilizing diode ZD3. An anode of the voltage stabilizing diode ZD3 is connected to the second terminal of the light emitting element 201, the second terminal of the light emitting element 202, a first terminal of the resistor R24, and a third terminal of the switch transistor Q7 through the capacitor C6. A first terminal of the switch transistor Q7 is connected to a node between a second terminal of the resistor R23 and a second terminal of the resistor R24. In the embodiment, the switch transistor Q7 is a MOS transistor.

The strobe protection circuit 50 eliminates low frequency current ripple. When the voltage output from the rectifier circuit 20 is too high, the voltage stabilizing diode ZD3 maintains the voltage at both ends at a preset value (e.g., 20V), thereby realizing strobe protection. When the voltage output from the rectifier circuit 20 is normal, the voltage can charge the capacitor C6, and since the input voltage is a sinusoidal waveform, when the voltage is less than a preset voltage, the voltage is not sufficient to control the switch transistor Q7 to be turned on, and at this time, the capacitor C6 can be used as a power source to continue to control the switch transistor Q7 to work normally. Therefore, the present application can avoid stroboscopic flashes from the light emitting module 200 by using the strobe protection circuit 50, which can reduce headaches and eyestrain, vision loss and other problems of the user.

The light emitting control circuit 100 further includes a filter circuit 80, the filter circuit 80 including a capacitor C7 and a resistor R25. A first terminal of the capacitor C7 is connected to the second terminal of the light emitting element 201, the second terminal of the light emitting element 202, and a first terminal of the resistor R25, and a second terminal of the capacitor C7 is connected to the second terminal of the switch transistor Q2, the second terminal of the switch transistor Q3, and a second terminal of the resistor R25.

Figure 4:
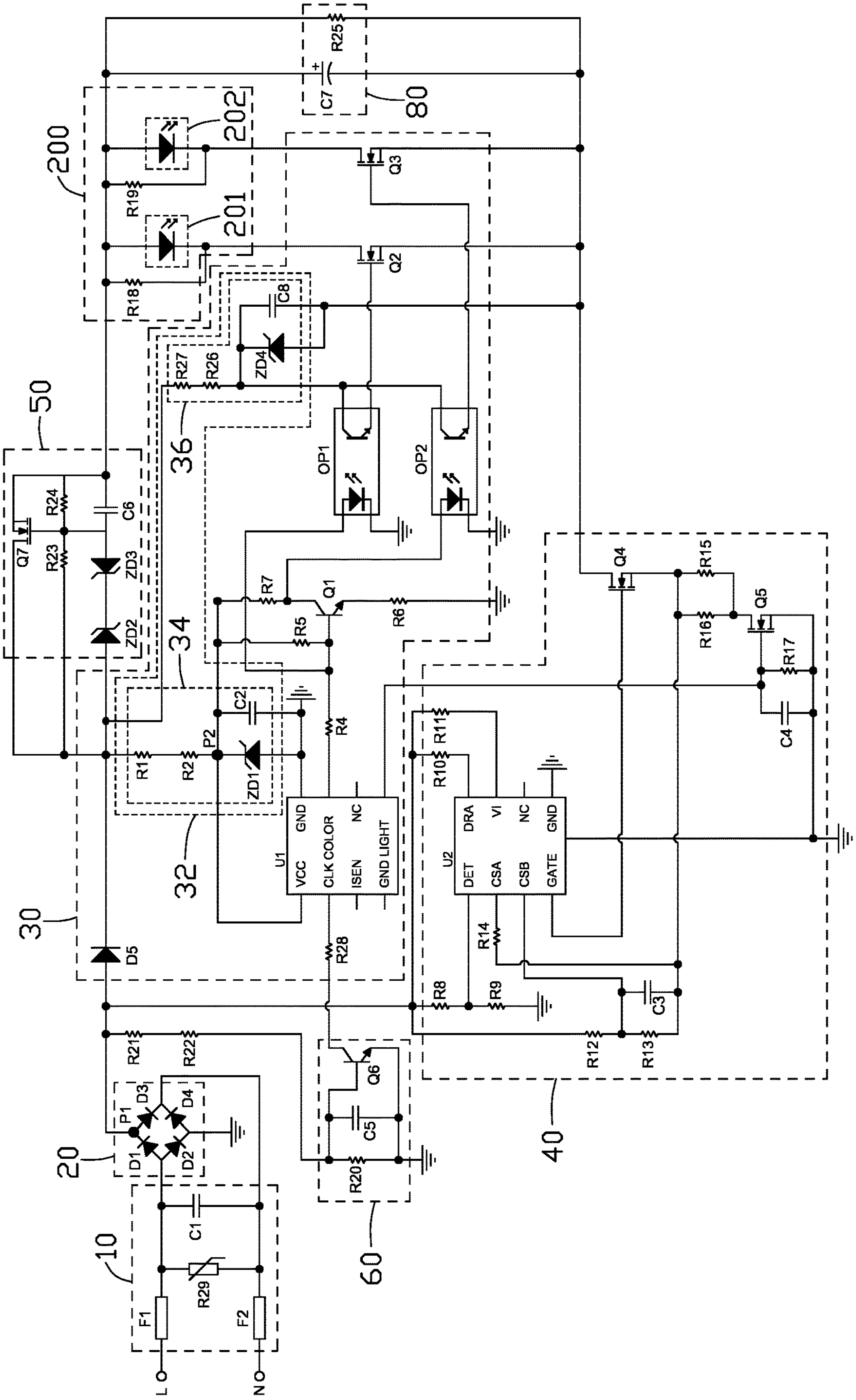
FIG. 4 is a circuit diagram of a lighting device according to another embodiment of the present application.

FIG. 4 is a circuit diagram of the lighting device 300 according to another embodiment of the present application.

The difference from the lighting device 300 illustrated in the embodiment of FIG. 3 is that, as shown in FIG. 4, in the embodiment, the voltage conversion circuit 32 further comprises a second voltage conversion unit 36. the second voltage conversion unit 36 includes a voltage stabilizing diode ZD4, a capacitor C8, and resistors R26 and R27.

The collector electrode of the first switch in the photoelectric coupler OP1 is connected to the cathode of the diode D5 through the resistor R26 and the resistor R27. The collector electrode of the first switch unit is also connected to a cathode of the voltage stabilizing diode ZD4 and the first terminal of the capacitor C8, and an anode of the voltage stabilizing diode ZD4 is connected to the second terminal of the capacitor C8 and the third terminal of the switch transistor Q4.

Figure 5:
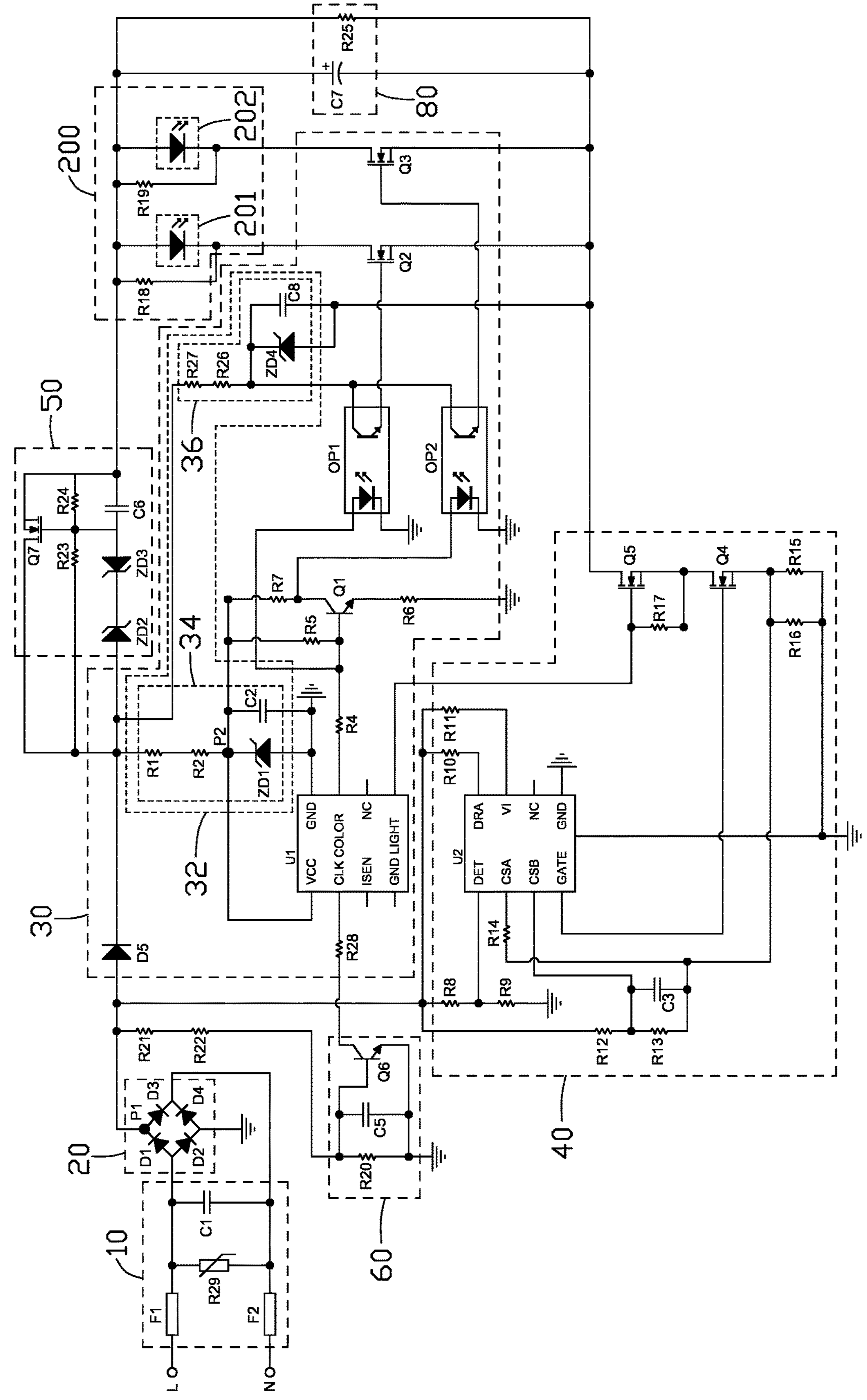
FIG. 5 is a circuit diagram of a lighting device according to another embodiment of the present application.

FIG. 5 is a circuit diagram of the lighting device 300 according to another embodiment of the present application.

The difference from the lighting device 300 illustrated in the embodiment of FIG. 4 is that, as shown in FIG. 5, in the embodiment, the brightness control pin LIGHT of the first chip U1 is connected to the first terminal of the switch transistor Q5, the first terminal of the switch transistor Q5 is also connected to the second terminal of the switch transistor Q5 through the resistor R17, the second terminal of the switch transistor Q5 is connected to the third terminal of the switch transistor Q4, the third terminal of the switch transistor Q5 to the third terminal of the switch transistor Q2 and the third terminal of the switch transistor Q3. The first terminal of the switch transistor Q4 is connected to the drive pin GATE of the second chip U2, the second terminal of the switch transistor Q4 is grounded through the resistor R15, the second terminal of the switch transistor Q4 is also grounded through the resistor R16, the second terminal of the switch transistor Q4 is also connected to the output current setting pin CSB of the second chip U2 through the capacitor C3, and the second terminal of the switch transistor Q4 is also connected to the output current setting pin CSB of the second chip U2 through the resistor R14. The second terminal of the switch transistor Q4 is also connected to the output current setting pin CSB of the second chip U2 through the resistor R14.

The operating principle of the lighting device 300 of the present application will be described below using the embodiment illustrated in FIG. 3 as an example.

In one scenario, the first control circuit 30 controls the light emitting module 200 to operate at a first color temperature in response to a first switch switching operation of the user (e.g., a first number of switching of the switch of the lighting device 300 by the user within a preset time), and the color temperature control pin COLOR of the first chip U1 outputs a control signal having a first duty cycle. Assuming that the first duty cycle is 0.2 and one time period is 1 s. Within 0-0.2 s, the color temperature control pin COLOR of the first chip U1 outputs a control signal to the first light emitting unit of the switch transistor Q1 and the photoelectric coupler OP1, thereby controlling the light emitting element 201 to emit light and controlling the light emitting element 202 not to emit light. Within 0.2 s-1 s, the color temperature control pin COLOR of the first chip U1 does not output a control signal. The first light emitting unit of the photoelectric coupler OP1 does not emit light, and the switch transistor Q1 is in an off state, thereby controlling the light emitting element 201 not to emit light and controlling the light emitting element 202 to emit light. Therefore, the light emitted from the light emitting module 200 will exhibit the first color temperature.

In another scenario, the first control circuit 30 controls the light emitting module 200 to operate at a second color temperature in response to a second switch switching operation of the user (e.g., a second number of switching of the switch of the lighting device 300 by the user within a preset time), and the color temperature control pin COLOR of the first chip U1 outputs a control signal having a second duty cycle. Within 0-0.3 s, the color temperature control pin COLOR of the first chip U1 outputs a control signal to the switch transistor Q1 and the first light emitting unit of the photoelectric coupler OP1, thereby controlling the light emitting element 201 to emit light and controlling the light emitting element 202 not to emit light. Within 0.3 s-1 s, the color temperature control pin COLOR of the first chip U1 does not output a control signal, the first light emitting unit of the photoelectric coupler OP1 does not emit light, and the switch transistor Q1 is in an off state, thereby controlling the light emitting element 201 not to emit light and controlling the light emitting element 202 to emit light. Therefore, the light emitted from the light emitting module 200 will exhibit the second color temperature.

The light emitting control circuit 100 and the lighting device 300 of the present application output control signals with different duty cycles to the light emitting module 200 through the first chip U1, thereby enabling the lighting device to present a variety of color temperature variations, which can solve the problem of limited number of color temperature variations of the lighting device in the prior art and enhance the user's experience.

Those of ordinary skill in the art should realize that the above embodiments are only used to illustrate the present application, but not to limit the present application. As long as they are within the essential spirit of the present application, the above embodiments are appropriately made and changes fall within the scope of protection of the present application.

What is claimed is:

1. A light emitting control circuit configured to connect a power supply and control a light emitting module to emit light, the light emitting module comprising a first light emitting element and a second light emitting element, and the light emitting control circuit comprising a first control circuit, the first control circuit electrically connected to the light emitting module, and the first control circuit configured to control color temperature of the light emitting module, wherein:

the first control circuit comprises a first chip, a voltage conversion circuit, a first switch transistor, a second switch transistor, a third switch transistor, a first photoelectric coupler, and a second photoelectric coupler, the voltage conversion circuit electrically is connected to the power supply, the voltage conversion circuit is configured to convert a power supply voltage output from a rectifier circuit and output a voltage signal, a first terminal of the first switch transistor is connected to a color temperature control pin of the first chip to receive a control signal output by the first chip, a second terminal of the first switch transistor is grounded, and a third terminal of the first switch transistor is connected to the voltage conversion circuit, the first photoelectric coupler comprises a first light emitting unit and a first switch, an anode of the first light emitting unit is connected to the color temperature control pin of the first chip to receive the control signal output from the first chip, a cathode of the first light emitting unit is grounded, an emitter electrode of the first switch is connected to a first terminal of the second switch transistor, and a collector electrode of the first switch is connected to the voltage conversion circuit to receive the voltage signal, and the second photoelectric coupler comprises a second light emitting unit and a second switch, an anode of the second light emitting unit is connected to the voltage conversion circuit to receive the voltage signal, a cathode of the second light emitting unit is grounded, an emitter electrode of the second switch is connected to a first terminal of the third switch transistor, and a collector electrode of the second switch is connected to the voltage conversion circuit to receive the voltage signal; a second terminal of the second switch transistor is connected to the second control circuit, a third terminal of the second switch transistor is connected to a first terminal of the first light emitting element, and a second terminal of the first light emitting element is connected to the power supply; a second terminal of the third switch transistor is connected to the second control circuit, a third terminal of the third switch transistor is connected to the first terminal of the second light emitting element, and a second terminal of the second light emitting element is connected to the power supply.

2. The light emitting control circuit of claim 1, wherein when the color temperature control pin of the first chip outputs the control signal, the control signal controls the first switch transistor to be turned on and the first switch of the first photoelectric coupler to be turned on, and controls the second switch of the second photoelectric coupler to be turned off, to control the third switch transistor to be turned off, so as to make the second light emitting element not to emit light, and the voltage signal outputted by the voltage conversion circuit controls the second switch transistor to be turned on to cause the first light emitting element to emit light.

3. The light emitting control circuit of claim 1, wherein when the color temperature control pin of the first chip does not output the control signal, the first switch of the first photoelectric coupler is in an off state to cause the second switch transistor to be turned off, thereby causing the first light emitting element not to emit light, and the voltage signal output from the voltage conversion circuit controls the second switch of the second photoelectric coupler to be turned on to control the third switch transistor to be turned on, thereby causing the second light emitting element to emit light.

4. The light emitting control circuit of claim 1, wherein the rectifier circuit comprises a first diode, a second diode, a third diode and a fourth diode, an anode of the first diode is connected to an anode of the second diode and a first output terminal of the power supply, a cathode of the first diode is connected to an anode of the third diode, and a cathode of the third diode is connected to a cathode of the fourth diode and a second output terminal of the power supply, an anode of the fourth diode is grounded and a cathode of the second diode is grounded.

5. The light emitting control circuit of claim 4, wherein the light emitting control circuit comprises a detection circuit, the detection circuit comprises a fourth switch transistor, a first resistor, a second resistor, a third resistor and a first capacitor, a first terminal of the fourth switch transistor is connected to a first node between the cathode of the first diode and the anode of the third diode through the first resistor and the second resistor, the first terminal of the fourth switch transistor is grounded through the third resistor, the first terminal of the fourth switch transistor is grounded through the third resistor, the first terminal of the fourth switch transistor is further grounded through the first capacitor, a second terminal of the fourth capacitor is grounded, and a third terminal of the fourth switch transistor is connected to a detection pin of the first chip.

6. The light emitting control circuit of claim 5, wherein when the power supply is turned on, the power supply voltage output from the first node controls the fourth switch transistor to be turned on.

7. The light emitting control circuit of claim 5, wherein the voltage conversion circuit comprises a first voltage conversion unit, the first voltage conversion unit comprises a first voltage stabilizing diode, a second capacitor, a fourth resistor and a fifth resistor, a cathode of the first voltage stabilizing diode is connected to the first node through the fourth resistor and the fifth resistor, an anode of the first voltage stabilizing diode is grounded, and the anode of the first voltage stabilizing diode is also connected to a ground pin of the first chip, a first terminal of the second capacitor is connected to the second node between the cathode of the first voltage stabilizing diode and the fourth resistor, a second terminal of the second capacitor is grounded, the second node is connected to a power pin of the first chip, the second node is also connected to the third terminal of the first switch transistor and the anode of the second switch through the sixth resistor.

8. The light emitting control circuit of claim 7, wherein the collector electrode of the first switch and the collector electrode of the second switch are both connected to the second node.

9. The light emitting control circuit of claim 7, wherein the voltage conversion circuit further comprises a second voltage conversion unit, the second voltage conversion unit comprises a second voltage stabilizing diode, a third capacitor, a seventh resistor and an eighth resistor, a cathode of the second voltage stabilizing diode is connected to the first node through the seventh resistor and the eighth resistor, an anode of the second voltage stabilizing diode is connected to the emitter electrode of the second switch, the first terminal of the third capacitor is connected to the cathode of the second voltage stabilizing diode, the second terminal of the third capacitor is connected to the anode of the second voltage stabilizing diode, and the collector electrode of the first switch and the collector electrode of the second switch are both connected to the first node through the seventh resistor and the eighth resistor.

10. The light emitting control circuit of claim 1, further comprising a second control circuit, wherein the second control circuit is electrically connected to the light emitting module, and the second control circuit is configured to control brightness of the light emitting module.

11. A lighting device comprising a light emitting module and a light emitting control circuit, the light emitting control circuit electrically connected between a power supply and the light emitting module, the light emitting control circuit configured to control the light emitting module to emit light, the light emitting module comprising a first light emitting element and a second light emitting element, and the light emitting control circuit comprising a first control circuit, the first control circuit electrically connected to the light emitting module, and the first control circuit configured to control color temperature of the light emitting module, wherein:

the first control circuit comprises a first chip, a voltage conversion circuit, a first switch transistor, a second switch transistor, a third switch transistor, a first photoelectric coupler, and a second photoelectric coupler, the voltage conversion circuit is electrically connected to the power supply, the voltage conversion circuit is configured to convert a power supply voltage output from a rectifier circuit and output a voltage signal, a first terminal of the first switch transistor is connected to a color temperature control pin of the first chip to receive a control signal output by the first chip, a second terminal of the first switch transistor is grounded, and a third terminal of the first switch transistor is connected to the voltage conversion circuit, the first photoelectric coupler comprises a first light emitting unit and a first switch, an anode of the first light emitting unit is connected to the color temperature control pin of the first chip to receive the control signal output from the first chip, a cathode of the first light emitting unit is grounded, an emitter electrode of the first switch is connected to a first terminal of the second switch transistor, and a collector electrode of the first switch is connected to the voltage conversion circuit to receive the voltage signal, and the second photoelectric coupler comprises a second light emitting unit and a second switch, an anode of the second light emitting unit is connected to the voltage conversion circuit to receive the voltage signal, a cathode of the second light emitting unit is grounded, an emitter electrode of the second switch is connected to a first terminal of the third switch transistor, and a collector electrode of the second switch is connected to the voltage conversion circuit to receive the voltage signal; a second terminal of the second switch transistor is connected to the second control circuit, a third terminal of the second switch transistor is connected to a first terminal of the first light emitting element, and a second terminal of the first light emitting element is connected to the power supply; a second terminal of the third switch transistor is connected to the second control circuit, a third terminal of the third switch transistor is connected to the first terminal of the second light emitting element, and a second terminal of the second light emitting element is connected to the power supply.

12. The lighting device of claim 11, wherein when the color temperature control pin of the first chip outputs the control signal, the control signal controls the first switch transistor to be turned on and the first switch of the first photoelectric coupler to be turned on, and controls the second switch of the second photoelectric coupler to be turned off, to control the third switch transistor to be turned off, so as to make the second light emitting element not to emit light, and the voltage signal outputted by the voltage conversion circuit controls the second switch transistor to be turned on to cause the first light emitting element to emit light.

13. The lighting device of claim 11, wherein when the color temperature control pin of the first chip does not output the control signal, the first switch of the first photoelectric coupler is in an off state to cause the second switch transistor to be turned off, thereby causing the first light emitting element not to emit light, and the voltage signal output from the voltage conversion circuit controls the second switch of the second photoelectric coupler to be turned on to control the third switch transistor to be turned on, thereby causing the second light emitting element to emit light.

14. The lighting device of claim 11, wherein the rectifier circuit comprises a first diode, a second diode, a third diode and a fourth diode, an anode of the first diode is connected to an anode of the second diode and a first output terminal of the power supply, a cathode of the first diode is connected to an anode of the third diode, and a cathode of the third diode is connected to a cathode of the fourth diode and a second output terminal of the power supply, an anode of the fourth diode is grounded and a cathode of the second diode is grounded.

15. The lighting device of claim 14, wherein the light emitting control circuit comprises a detection circuit, the detection circuit comprises a fourth switch transistor, a first resistor, a second resistor, a third resistor and a first capacitor, a first terminal of the fourth switch transistor is connected to a first node between the cathode of the first diode and the anode of the third diode through the first resistor and the second resistor, the first terminal of the fourth switch transistor is grounded through the third resistor, the first terminal of the fourth switch transistor is grounded through the third resistor, the first terminal of the fourth switch transistor is further grounded through the first capacitor, a second terminal of the fourth capacitor is grounded, and a third terminal of the fourth switch transistor is connected to a detection pin of the first chip.

16. The lighting device of claim 15, wherein when the power supply is turned on, the power supply voltage output from the first node controls the fourth switch transistor to be turned on.

17. The lighting device of claim 15, wherein the voltage conversion circuit comprises a first voltage conversion unit, the first voltage conversion unit comprises a first voltage stabilizing diode, a second capacitor, a fourth resistor and a fifth resistor, a cathode of the first voltage stabilizing diode is connected to the first node through the fourth resistor and the fifth resistor, an anode of the first voltage stabilizing diode is grounded, and the anode of the first voltage stabilizing diode is also connected to a ground pin of the first chip, a first terminal of the second capacitor is connected to the second node between the cathode of the first voltage stabilizing diode and the fourth resistor, a second terminal of the second capacitor is grounded, the second node is connected to a power pin of the first chip, the second node is also connected to the third terminal of the first switch transistor and the anode of the second switch through the sixth resistor.

18. The lighting device of claim 17, wherein the collector electrode of the first switch and the collector electrode of the second switch are both connected to the second node.

19. The lighting device of claim 17, wherein the voltage conversion circuit further comprises a second voltage conversion unit, the second voltage conversion unit comprises a second voltage stabilizing diode, a third capacitor, a seventh resistor and an eighth resistor, a cathode of the second voltage stabilizing diode is connected to the first node through the seventh resistor and the eighth resistor, an anode of the second voltage stabilizing diode is connected to the emitter electrode of the second switch, the first terminal of the third capacitor is connected to the cathode of the second voltage stabilizing diode, the second terminal of the third capacitor is connected to the anode of the second voltage stabilizing diode, and the collector electrode of the first switch and the collector electrode of the second switch are both connected to the first node through the seventh resistor and the eighth resistor.

20. The lighting device of claim 11, further comprising a second control circuit, wherein the second control circuit is electrically connected to the light emitting module, and the second control circuit is configured to control brightness of the light emitting module.

* * * * *